Feb. 16, 1937. K. E. BEMIS 2,070,776
DRINK MIXER
Filed Sept. 14, 1936 2 Sheets-Sheet 2
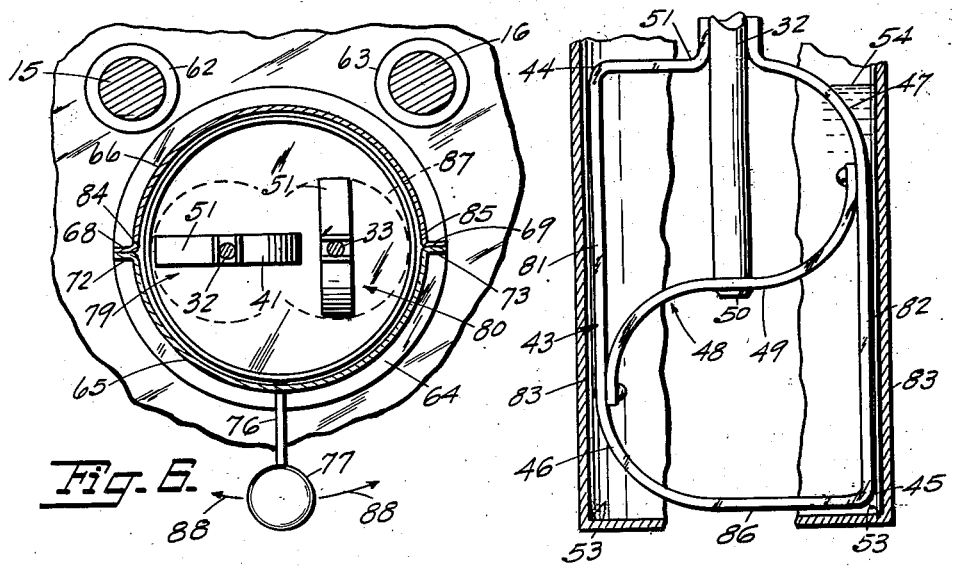
INVENTOR.
Kenneth E Bemis
BY Philip A Friedell
ATTORNEY.

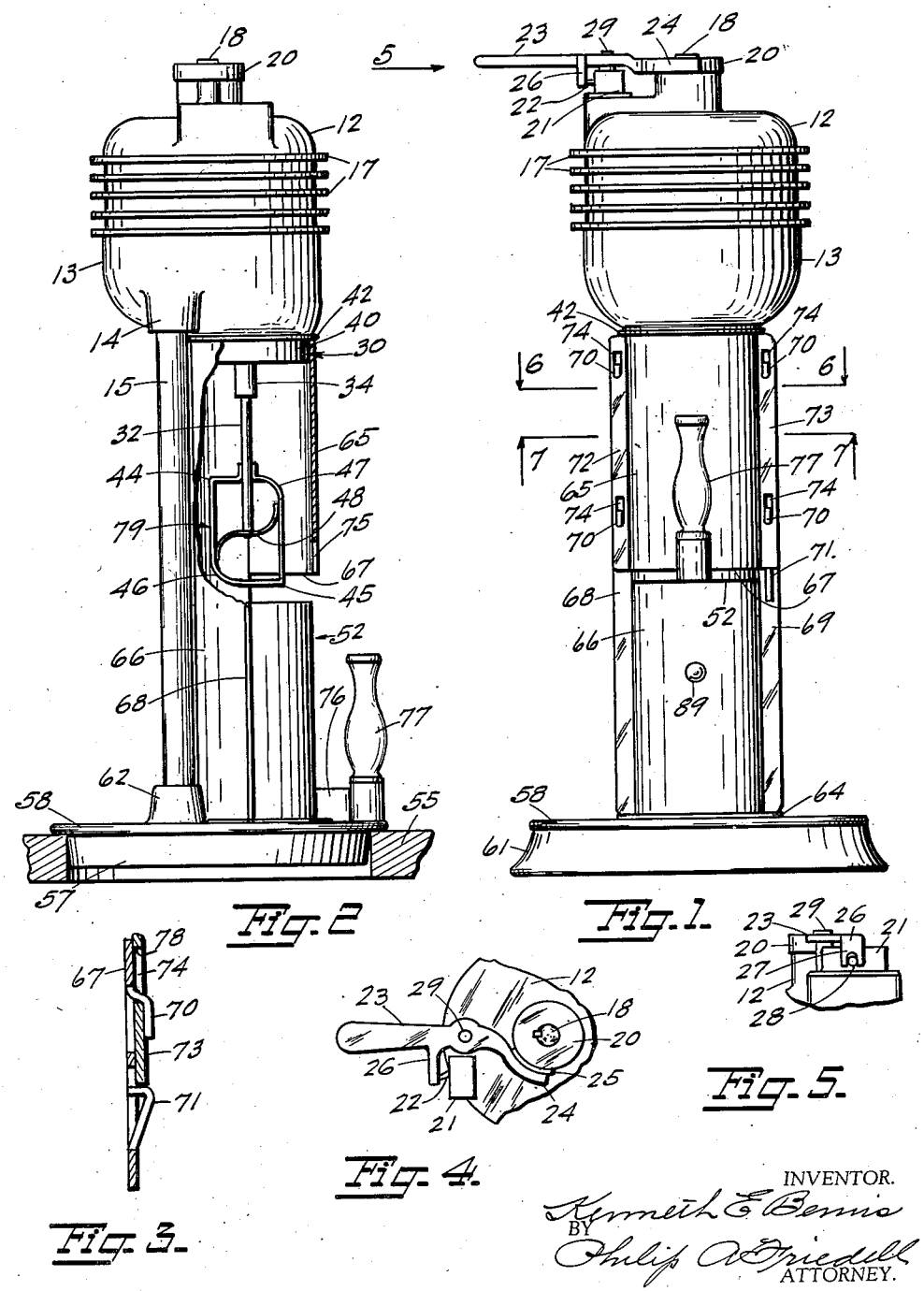

Patented Feb. 16, 1937

2,070,776

UNITED STATES PATENT OFFICE 2,070,776

DRINK MIXER

Kenneth E. Bemis, Oakland, Calif.

Application September 14, 1936, Serial No. 100,713

6 Claims. (Cl. 259—104)

This invention, a drink mixer, is a motor-operated device particularly designed for mixing malted milks and similar drinks in such thorough and rapid manner as to substantially nullify melting during mixing, and causing a decided increase in volume of the mix when the drink is completed.

The usual types of drink mixers employ one or two impellers to agitate the drink mixture, which, in the case of malted milk consists of powdered malted milk together with frozen milk, ice cream, and other materials, as may be desired. These mixers usually use a small, low horsepower motor, varying anywhere from one-fortieth to possibly one-tenth horse-power.

With drink mixers of the usual types, the agitation of the mix is dependent upon the circulation created by the impellers, and due to the restricted circulation, especially in the heavy mix of frozen materials, some of the mixture freezes to portions of the inner periphery and corners of the container at the expense of other portions of the mixture which are melted, resulting in an incomplete mix. In addition, an abnormal length of time is required for mixing, usually from two to three minutes, resulting in considerable melting and a reduction in volume of from ten to fifteen percent.

With this invention, agitators of special construction and form are used, together with a container which can be manually rotated through an angle of more than one hundred and eighty degrees, whereby the agitators are designed to closely cooperate with the entire bottom and wall surfaces of the container. The agitation is therefore complete, since, during manual rotary reciprocation of the container, due to the specific form and size of the agitators as related to the form and size of the container, freezing of any portion of the mixture is prevented, and also, due to the fact that a motor of excess power is used for driving the agitators, the mixture is completed in about one-half minute, instead of the usual two to three minutes, resulting in a homogeneous drink which is unmelted.

With this excess power and thorough agitation and beating, the volume of the mix is considerably increased, amounting to about fifteen percent, instead of the reduction in volume which usually occurs.

For the above reasons, the specific type of agitator, the high power motor, and rotatable container, are features of prime importance, the combination of which produce the unusual results attained.

A divisional application, filed under date of Dec. 23, 1936 and Serial No. 117,247, is specifically directed to the container and the container sleeve.

The objects of the invention are as follows:

First; to provide a drink mixer which will produce a thoroughly mixed drink in an unusually short period of time, thus decreasing melting and increasing the volume of the mix.

Second; to provide a drink mixer as outlined which circulates and agitates a drink mix throughout its entire volume and thus prevent freezing of a portion of the mix at the expense of another portion.

Third; to provide a mixer as outlined with means for manually rotating or reciprocating the container during operation of the mixer, to cause the agitators to closely approach all inner peripheral surfaces, as well as the corners and bottom of the container to prevent freezing incrustation on any portion thereof.

Fourth; to provide a drink mixer with a driving motor of excess horsepower for driving the agitators for violent agitation without diminution in speed due to any load which may result in the partly frozen materials of the mix.

Fifth; to provide a container housing or sleeve which is rotatable with the container to form an efficient anti-splash device and to protect the container from extraneous heat during mixing, and also to provide said sleeve with an intermediate stop for clearing the agitators of any adhering mix.

Sixth; to provide an agitator of special form, and consisting of an enclosed S-shaped member, the closure being substantially rectangular in form.

Seventh; to provide a mixer as outlined mounted on a standard refrigerator cover for mounting directly on a refrigerator.

Eighth; to provide a detachable base for the refrigerator-type cover, for mounting the machine on supports removed from a refrigerator, such as on a counter or table.

Other objects and advantages of the invention will become apparent as the following description is read on the drawings forming a part of this specification, and in which similar reference characters are used to designate similar parts throughout the several views, of which:

Fig. 1 is a front elevation of the invention with the container in drink-mixing position, and with detachable foundation attached.

Fig. 2 is a side elevation of Fig. 1, with a portion of the container housing or sleeve broken out to show the agitator, and with the container in lowered, non-operative position, and with the brake lever and switch removed, and the invention mounted on a refrigerator.

Fig. 3 is an enlarged section through the container housing flange assembly.

Fig. 4 is a fragmentary plan view showing the brake drum, switch, and brake and switch-operating lever.

Fig. 5 is a fragmentary view looking in the direction 5, Fig. 1.

Fig. 6 is an enlarged fragmentary section taken on line 6—6 of Fig. 1.

Fig. 7 is an enlarged fragmentary sectional view taken on line 7—7 of Fig. 1 with a portion of the gear housing broken out to show the gear assembly.

Fig. 8 is an enlarged elevation of the agitator showing its relation to the bottom and sides of the container in two positions of the agitator, the same section of the container being shown on both sides of the agitator.

Fig. 9 is a fragmentary enlarged section through the mixer base.

Fig. 10 is a fragmentary view of the base with the foundation shown in section.

Fig. 11 is an enlarged section through the base and receptacle.

The invention consists of an excess horse-power motor 12 fitted with a base sleeve or pocket 13 which is provided with integral post, or standard sockets 14, in which the posts or standards 15 and 16 are suitably fitted and secured.

The power of the motor 12 is far in excess of actual requirements, and considerably greater than is now used on drink mixers of the same capacity, and the rated horsepower for mixing twelve 12 is one quarter horsepower, and which available power is an ounce drinks, and which available power is an important feature of this invention, as the speed of mixing and increase in volume of the mixed drink is dependent on this excessive power. With less power, there is a decrease in the speed of mixing or increase of mixing time, decrease in volume of drink, increase in melting of the mix ingredients, and an all around poorer quality of drink, lacking in smoothness and other desirable characteristics.

This motor is vertically mounted as shown, and is provided with ornamental ring-type cooling vanes 17, and the top end 18 of the shaft 19 is extended and has a brake drum 20 mounted on the extension.

Mounted on the upper end of the motor 12 is an electric switch 21, which has a ball-type operating or switch lever 22 for making and breaking circuit to the motor 12.

Also mounted on the upper end of the motor 12 is a combined brake- and switch-operating lever 23, having an integral brake portion 24 provided with a brake shoe 25, and, a switch-operating lateral extension 26 having a forked end 27 spanning the ball 28 on the switch lever 22, the lever 23 being pivoted at 29.

Movement of lever 23 manually in one direction coincidently releases the brake and cuts the motor 12 in circuit, and movement of the lever in the opposite direction coincidently breaks the circuit and stops the motor by applying the brake.

Mounted at the lower end of the motor socket 13 is a gear housing and container sleeve pilot 30, which is eccentrically mounted relative to the motor shaft 19, to permit gearing of the two agitators for opposed rotation, and includes a base 31 through which the agitator shafts 32 and 33 project, and which are rotatable in bearings 34 and 35 which are fixed in, or integral with the base 31.

Mounted within the gear housing is a train of gears, including the motor gear 36 which meshes with one agitator gear 37, which gear 37 meshes with the other agitator gear 38, the gear 36 being keyed to the motor shaft as shown at 39, and gears 37 and 38 being fixed on the respective agitator shafts 32 and 33. Thus, the two agitator shafts are driven in opposite directions.

The gear housing 30 has a peripheral wall 40 which is circular in form and concentric to a point 41 intermediate the axes of the agitator shafts, and a flange 42 is formed at the upper end of the wall 40 to form a spacing and stop member for the container sleeve.

Fixedly secured on each agitator shaft 32—33 is an agitator consisting of a frame 43 of substantially rectangular form with two square corners 44 and 45 and two rounded corners 46 and 47, diagonally related; the rounded corners forming two opposed rounded portions of an S-shaped insert 48, the center horizontal bar 49 of which has the lower end of the agitator shaft secured therein as shown at 50, the shaft passing between the terminals of the top transverse member 51 of the frame, thus forming a rectangular frame agitator with diagonal corners respectively square and rounded or curved, and with an S-shaped insert enclosed in the frame.

This agitator is shown with a portion of the container 52 shown relative to both sides of the agitator to illustrate the close and varied relation of the sides and bottom of the agitator during rotation; that on the right of the view showing the sharp corner 45 closely approaching the corner 53 of the container, while on the left is shown the clearance offered by the curved corner 46. For this reason, while the agitator is simple in design, the action is general through the mix, and with each revolution, the agitator cuts through two different positions in the mix 54, and the same results are obtained also at the upper end of the agitator.

The unit is mounted on a base, which consists of a cover for a refrigerator 55, and consists of a housing 56 having an encompassing cushion 57 of rubber or other resilient material suitably cemented or affixed to the housing or shell and having an encompassing flange 58; the interior of the shell being suitably packed with heat insulation 59, which is retained by a cap 60.

A foundation 61, which is circular in form, is provided for mounting the mixer on counters or other places removed from the refrigerator.

Integral with the base are two hubs 62 and 63 in which the lower ends of the standards 15 and 16 are suitably secured, these standards acting as supports for the motor and as spacers between the motor and the base.

A receptacle 64 is removably mounted in the base to catch any reject fluid from the container during mixing, and also functions as a bearing for the lower end of the container housing or sleeve.

The container housing or sleeve consists of two parts which are individually removable and separable at will, and consists of a front section 65 and a rear section 66, the top ends of the sections being formed to rotatably fit the bearing wall 40 on the gear housing.

The lower end of the rear section rotatably fits in the receptacle 64, while the front section terminates midway of the height of the rear section, as indicated at 67.

The rear section 66 has a flange 68, and another flange 69 formed along the respective sides and has retaining lugs 70 dependently formed and projecting forwardly from the front face of each flange, and also has a spring latch 71 formed to lock the front section in position.

The front section 65 of the container sleeve, or guiding and centering means, has flanges 72 and 73 formed along its respective sides, in which flanges the slots 74 are formed to frontally receive the lugs 70, the spring latch cooperating with the bottom edge of one of the flanges.

A container handle connection receiving slot 75 is centrally formed at the bottom of the front section to receive the handle connection 76 on container 52, to permit raising the container to completely enclosed position within the sleeve or guiding and centering means.

The container 52 is cylindrical in form and has a handle 77 connected by a single, transverse handle connection 76 which is attached at the bottom of the container to permit complete enclosure of the container in the sleeve with a minimum length of slot 75.

The front section 65 of the container guide or sleeve is easily removed by depressing the catch 71 and sliding the front section down until the top wall 78 of the slots 74 rest on the lugs 70, and then frontally removing the section.

The rear section 66 can then easily be removed by rotating it about its axis to the position normally occupied by the front section, then tilting the top end frontally and lifting it from the receptacle 64.

The operation of the invention is as follows:

The mix, including all desired ingredients, is placed in container 52, which is then placed in the machine in the position shown in Fig. 2, then raised to the position shown in Fig. 1, with the handle connection 76 in the slot 75.

Lever 23 is then moved to operating position, coincidently releasing brake 24—20, and throwing switch lever 22 to "on" position, starting the motor, which drives the two agitators 79 and 80 in opposite directions, the square corner 45 and round corner 46 alternately cooperating with the liquid adjacent to the corner 53 of the container and in spaced relation thereto, while the vertical members 81 and 82 alternately closely cooperate or approach the side wall of the container indicated at 83.

If the container was held in one position, the side bars 81 and 82 would only approach the container wall at two points 84 and 85 and the mix would be permitted to freeze on other portions of the wall.

Similarly, the bottom bars 86 would only cooperate adjacently to the bottom over a restricted circular area as shown by the dotted line 87, Fig. 6.

This is overcome, however, by manually rotatably reciprocating the container and container sleeve by means of the container handle, as shown by the arrows 88, the sleeve being coincidently rotated by cooperation of the handle connection 76 with the sleeve through the medium of the walls of the slot 75, and a full sweep is thus obtained of the walls and bottom of the container, while the two S-shaped inserts operate through different portions of the central portion of the mix. Thereby complete agitation is provided.

With the excess power available, there is no reduction in speed when the ingredients of the mix are at first segregated and rather solidly frozen, and the agitators operate at full speed throughout the mixing period. This, obviously could not occur with power generally available on such devices.

After the mix is fully agitated, (which requires about thirty seconds with this form of agitator of enclosed S-shape and the excess power used,) the container is lowered until the bottom strikes the obstructing lug 89, which in its preferred form, is merely a semi-spherical projection located midway between the bottom of the front section and bottom of the rear section. In this position of the container, the beaters 79 and 80 have their lower bars 86 clearing the mix or drink in the container, and therefore clear themselves of any adhering mix, which is deposited on the upper walls of the container, draining down to the drink proper.

Lever 23 is then moved to its original position, breaking the circuit and braking the motor, after which the container is lowered to the position shown in Fig. 2 and removed, and due to the rapidity of completing the drink, very little melting has occurred and the volume has increased considerably, as from ten to twenty percent.

It will be understood that variations in construction and arrangement of parts, which variations are consistent with the appended claims, may be resorted to without detracting from the spirit or scope of the invention, or sacrificing any of the advantages thereof.

I claim:

1. A drink mixer comprising, a container having a handle; a container sleeve slidably receiving said container; an intermediate obstruction on said sleeve for cooperation with said container in partly lowered position; agitating means within said sleeve and driving means therefor; said sleeve being rotatably mounted for coincident manual rotary reciprocation with said container.

2. In a drink mixer, a container and a pair of spaced rotary agitators having a frame of substantially rectangular form with the diagonally related corners respectively square and curved and alternately operating adjacent to the sides, corners and bottom of said container, and, clearing said corners.

3. In a drink mixer, a container and a pair of spaced rotary agitators having each a frame of substantially rectangular form with the diagonally related corners respectively square and curved and alternately closely approaching the sides, corner, and bottom of said container, and, clearing said corners, and an S-shaped insert in each frame cutting through different portions of a mix during each revolution.

4. In a drink mixer, a container and a pair of spaced rotary agitators having a substantially rectangular frame; rotatably mounted guiding and centering means for said container consisting of two sections separable and removable at will and having an intermediate stop for obstructive cooperation with said container in partly lowered position; and a handle for said container cooperating with said guiding and centering means for manual rotary reciprocation to cause said agitators to cooperate with all portions of the interior of said container.

5. A drink mixer comprising, a container having a handle; a motor having a pilot; a receptacle; guiding and centering means rotatably mounted with its opposite ends in said receptacle and on said pilot; rotary agitators of substantially rectangular form centrally located in said guiding and centering means and driven in opposite directions by said motor, said handle cooperating with said guiding and centering means for manual rotary reciprocation.

6. A drink mixer comprising, a container having a handle; a motor having a pilot; a receptacle; guiding and centering means rotatably mounted with its opposite ends in said receptacle and on said pilot and consisting of a front section and a rear section separable and removable at will, said rear section having an obstruction for stopping said container in partly lowered position; rotary agitators depending from said pilot and driven in opposite directions by said motor, said handle cooperating with said guiding and centering means for manual rotary reciprocation.

KENNETH E. BEMIS.